Aug. 19, 1947.    R. L. HAYMAN    2,425,935
TUBE HOLDING BLOCK
Filed July 10, 1943
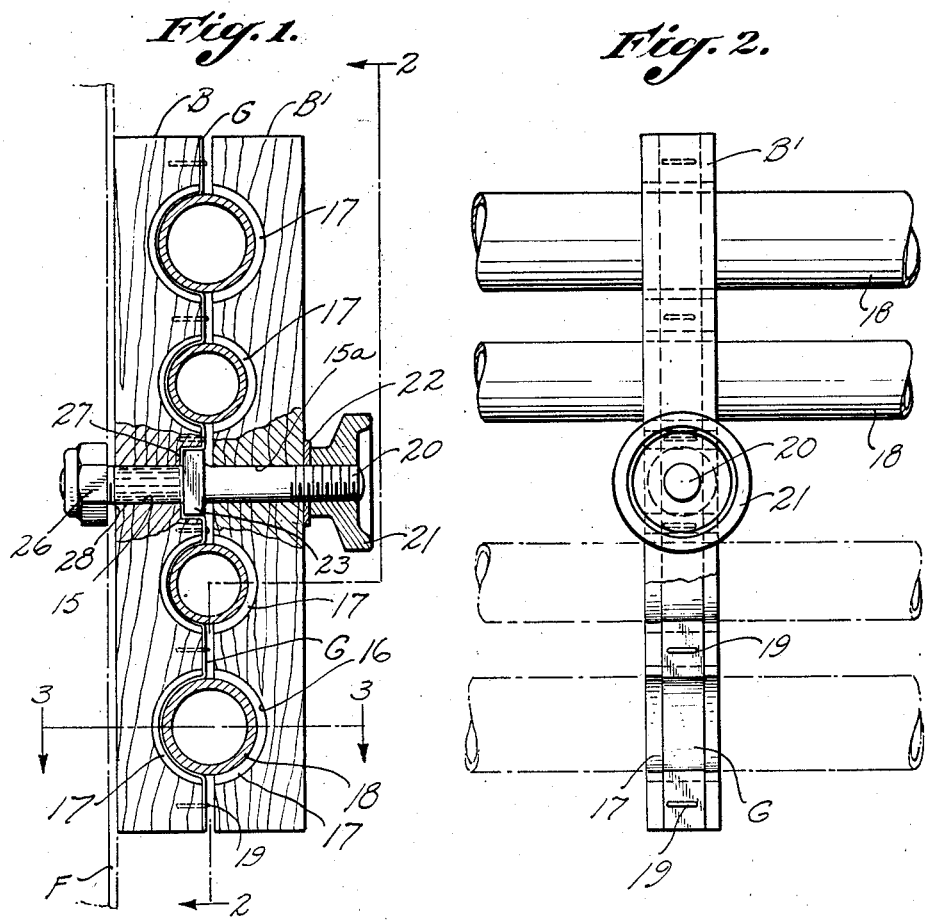
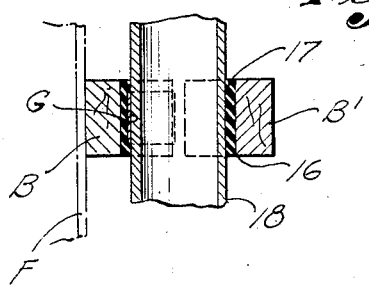
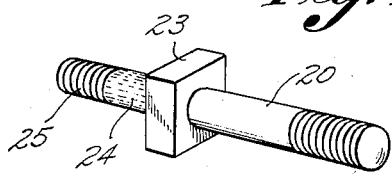
INVENTOR.
Richard L. Hayman,
BY
Robert W. Fulwider
ATTORNEY.

Patented Aug. 19, 1947

2,425,935

UNITED STATES PATENT OFFICE 2,425,935

TUBE HOLDING BLOCK

Richard Lowell Hayman, North Hollywood, Calif.

Application July 10, 1943, Serial No. 494,165

2 Claims. (Cl. 174—135)

This invention relates to improvements in multi-line supports, and more particularly, although not necessarily, to those supports for use in aircraft to support and secure metallic conduits from injury due to vibration, and to bond the conduits to the aircraft for grounding static charges of electricity tending to accumulate therein.

More specifically, this invention relates to conduit supports which embody complemental clamping blocks of rigid material having conduit-receiving seats in their opposing faces, with shock-absorbing grommets lining the seats, and a metallic bonding strip lining the grommets which has conducting contact with fastening members for securing the blocks together and to the frame of the aircraft.

Whether of the type above specified or not, with conduit supports as heretofore proposed, complete disassembly of the support is required to apply or remove the conduits, as well as to attach or detach the support to or from the aircraft frame. Because of this disassembly requirement, initial installation as well as subsequent removal of the conduits from the support is rendered difficult and time-consuming. Also, when the clamping blocks are detached, the bonding strip is free to be displaced and become bent because of its pliability.

A purpose of the present invention is the provision of a conduit support which is characterized by a construction that permits the conduits to be assembled in the support, and the support with its associated conduits installed on the aircraft structure without the necessity of disassembling the support. It is also a purpose of this invention to provide a conduit support in which a part of the support is quickly and easily removable to allow quick access to and repair of the conduits, the major part of the support remaining installed on the aircraft structure, including the bonding strip to prevent accidental detachment and distortion thereof.

Another object of my invention is the provision of a superior method of fastening the bonding strip to the block so as to insure its permanency.

Only one form of conduit support embodying the invention will be described, and the novel features thereof will be pointed out in claims.

In the accompanying drawings:

Fig. 1 is a view showing in side elevation and partly in section, one form of conduit support embodying the invention and in conduit-supporting position on a frame-part of an aircraft;

Fig. 2 is a view taken on the line 2—2 of Fig. 1;

Fig. 3 is a fragmentary horizontal sectional view taken on the line 3—3 of Fig. 1;

Fig. 4 is an enlarged detail perspective view of the bolt shown in Fig. 1.

Referring to the drawings in detail wherein similar reference characters refer to similar parts in each of the several views, complemental clamping blocks B and B¹ formed of any suitable rigid material such for example as wood or plastic, are provided. These blocks are formed with aligned bores 15 and 15ª respectively, and on their confronting faces with conduit-receiving seats 16 at intervals along the length of the blocks and transversely thereof.

Each pair of seats is provided with similarly shaped resilient linings or grommets 17 preferably formed of soft rubber, whose internal diameters are substantially the same as the external diameters of the respective conduits or lines 18 to be seated therein. The lining sections for the seats 16 of the block B¹ may be secured therein against displacement, by a light application of cement, while the lining sections 17 for the seats 16 of the block B besides being cemented in place are additionally secured by a bonding strip G of pliable metal adapted to electrically connect the conduits to the frame.

This bonding strip G may be preformed or may be pressed into the seats 16 after the grommets are in place so as to assume the semi-circular contour of the seats, with intervening flat portions lying contiguous to the flat portions of the face of the block. The strip G is preferably secured to the block B and in covering relation to the linings 17 by a plurality of staples 19 or other suitable fastening members. These staples are driven through the strip and into the flat portions of the face of the block. Thus the original contour of the strip is maintained, and the strip is secured against movement in or displacement from the seats 16.

The block B¹ is removably secured to the block B and in clamping relation to the interposed conduits 18, through the provision of a securing element preferably in the form of a bolt 20 extended through the bores 15 and 15ª, and a nut 21, wing, thumb, or otherwise, abutting the outer face of the block through an interposed washer 22.

The bolt 20 is designated for permanent retention within the block B as it is this block that is adapted for permanent association with the frame or other structural part of the aircraft on which the conduit support is installed. To this end a non-circular head 23 is formed on the bolt, while beyond this head the bolt is provided with longitudinally extending barbs 24 or other forms of projections terminating where the screw-threaded extremity 25 of the bolt begins for the reception of a lock nut 26.

To accommodate the head 23 so that it may function to secure the bolt against rotation in the block B, the block may be formed on its opposed face with a recess 27 shaped the same as the head. Moreover, the head when seated in the recess coacts with the nut 26 to secure the bolt against axial displacement from the block.

At the recess 27, the bonding strip G may be divided to accommodate the bolt 20 or it may be formed with an opening. In either event, the strip extends into the recess to have firm contact with the head 23, and thus form the required bond to ground any static accumulating on the metal conduits.

As applied to the block B, where the latter is formed of wood, the bolt has a driving fit in the bore 15 so that the barbs 24 frictionally lock the bolt in the block against endwise removal before the nut 26 is applied incident to mounting the block on the aircraft frame. Should the block B be formed of plastic material the bolt may be molded in the block to achieve the same end.

As previously stressed herein, this invention permits the conduits to be assembled therein, and the support with the conduits installed on the aircraft structure, without the necessity of disassembling the support. Also, to remove the conduits for repair, it is necessary only to remove a part of the support, the rest of the support remaining installed on the aircraft structure. These advantages will become apparent from the following description of the use of the support in actual practice.

Assuming that the blocks B and B¹ are detached one from the other, the conduits 18 can be attached to the support by applying the blocks to opposite sides of the conduits so that they repose within the seats 16, whereupon the blocks can be brought into clamping relation to the conduits by applying the nut 21. Thus the support with the conduits clamped therein is ready for installation on the aircraft structure.

A frame part F of the aircraft structure is shown in Figs. 1 and 3. To install the support and its conduits on this frame part, it is only necessary to extend the projecting extremity 25 of the bolt 20 through a suitable opening 28 in the frame part, and then apply to such extremity the nut 26. Thus the support is fixedly secured to the frame part to properly support the conduits thereon, and without the necessity of disassembling the support to effect such installation.

As the support is installed, the bonding strip G serves to bond the several conduits to the frame part through the head 23, the bolt 20, and the nut 26. Also, the resilient linings 17 serve to absorb any vibrations which may be communicated to the conduits.

As shown in Fig. 2, the bonding strip may be of less width than the linings 17, so that under the clamping action of the blocks the semi-circular portions of the bonding strip will be pressed in to the linings to bring the soft marginal edges of the linings into contact with the metal conduits. Thus is eliminated any additional vibration of the conduits which might otherwise occur if the bonding strip alone contacted with the conduits at points within the seats of the block B. Since the bonding strip G is pressed into the lining 17, the latter will be held against edgewise movement from the block B.

To remove the conduits from the support such as is occasioned when repairing the conduits, only the block B¹ need be removed, and this can be accomplished with dispatch by removing the nut 21 from the bolt and slipping the block from the bolt. Removal of the block B¹ and the conduits leaves the block B installed on the frame part F, together with the bolt 20 and the bonding strip S. Because the bonding strip is permanently secured to the block B by the staples 19, it cannot be moved in the seats or displaced accidentally following removal of the blocks. Moreover, the bonding strip confines the sectional linings in the seats of the block B against displacement.

Although there is herein shown and described only one form of conduit holder embodying my invention, it is to be understood that various changes and modifications may be made herein without departing from the spirit of this invention and the scope of the appended claims.

I claim:

1. A conduit support comprising: a bolt having a non-circular integral head between its ends; a first clamping block having a bore receiving a portion of said bolt so that the bolt projects from opposite sides of the block, and a recess non-rotatably receiving said head; means for securing said bolt against endwise movement in said block; a second clamping block having a bore receiving that portion of said bolt projecting from one side of the first clamping block; complemental seats in the confronting sides of said blocks for receiving conduits therein; individual resilient linings for said seats; a bonding strip on that side of said first block confronting the second block, said strip having portions in said seats to confine the linings therein, other portions extending between the seats, and other portions extending into said recess and having contact with said head; staples driven through said strip and into said second block for securing the strip on the block; a nut on said bolt for confining the second clamping member against removal from the bolt and for drawing the two members into clamping engagement with the conduits; and a second nut on that portion of said bolt projecting from the other side of the first clamping member and coacting with the bolt to secure said member to a supporting structure.

2. A conduit support comprising: a bolt having a non-circular integral head between its ends; a first clamping block having a bore receiving a portion of said bolt so that the bolt projects from opposite sides of the block, and a recess non-rotatably receiving said head; means for securing said bolt against endwise movement in said block; a second clamping block having a bore receiving that portion of said bolt projecting from one side of the first clamping block; complemental seats in the confronting sides of said blocks for receiving conduits therein; individual resilient linings for said seats; a bonding strip on that side of said first block confronting the second block, said strip having portions in said seats to confine the linings therein, other portions extending between the seats, and other portions extending into said recess and having contact with said head; staples driven through said strip and into said second block for securing the strip on the block; means for confining the second clamping member against removal from the bolt and for drawing the two members into clamping engagement with the conduits; and means coacting with the bolt to secure said member to a supporting structure.

RICHARD LOWELL HAYMAN.

REFERENCES CITED

The following references are of record in the file of this patent:

UNITED STATES PATENTS

| Number | Name | Date |
| --- | --- | --- |
| 2,338,660 | Morehouse | Jan. 4, 1944 |
| 1,657,813 | Andrews | Jan. 31, 1928 |
| 1,966,835 | Stites | July 17, 1934 |
| 2,327,048 | Joyce | Aug. 17, 1943 |
| 945,350 | Tinsley | Jan. 4, 1910 |

OTHER REFERENCES

Bulletin #1350, March 1917, by Electrical Development & Machine Co., entitled "Franklin," pages 1 and 2, class 174–157.